United States Patent [19]

Bergmann et al.

[11] Patent Number: 4,496,480

[45] Date of Patent: Jan. 29, 1985

[54] ISOTHIAZOLAZO DYES HAVING COUPLING COMPONENTS WHICH ARE FREE FROM UNSATURATED ALIPHATIC RADICALS

[75] Inventors: Udo Bergmann, Darmstadt; Johannes P. Dix, Neuhofen; Guenter Hansen; Ernst Schefczik, both of Ludwigshafen, all of Fed. Rep. of Germany

[73] Assignee: BASF Aktiengesellschaft, Ludwigshafen, Fed. Rep. of Germany

[21] Appl. No.: 463,001

[22] Filed: Feb. 1, 1983

[30] Foreign Application Priority Data

Feb. 27, 1982 [DE] Fed. Rep. of Germany ....... 3207209

[51] Int. Cl.³ .................. C09B 29/039; C09B 29/08; C09B 29/095; C09B 29/36
[52] U.S. Cl. .................................. 534/794; 534/765; 534/769; 534/775; 534/778; 534/795
[58] Field of Search ............... 260/158, 146 R, 152

[56] References Cited

U.S. PATENT DOCUMENTS

| 4,225,490 | 9/1980 | Entschel et al. | 260/156 |
| 4,330,467 | 5/1982 | Fleischer et al. | 260/155 |
| 4,354,970 | 10/1982 | Fleischer et al. | 260/158 |

FOREIGN PATENT DOCUMENTS

| 1379233 | 1/1975 | United Kingdom | 260/158 |
| 2041391 | 9/1980 | United Kingdom | 260/158 |

Primary Examiner—Floyd D. Higel
Attorney, Agent, or Firm—Oblon, Fisher, Spivak, McClelland & Maier

[57] ABSTRACT

Compounds of the general formula I

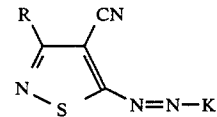

where R is substituted alkyl and K is the radical of a coupling component free from unsaturated aliphatic radicals, are very useful for dyeing cellulose esters and synthetic polyesters.

9 Claims, No Drawings

ISOTHIAZOLAZO DYES HAVING COUPLING COMPONENTS WHICH ARE FREE FROM UNSATURATED ALIPHATIC RADICALS

The present invention relates to compounds of the general formula I

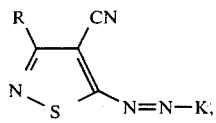

where R is substituted alkyl and K is the radical of a coupling component free from unsaturated aliphatic radicals.

R is, in particular, $C_1-C_4$-alkyl which is substituted by chlorine, bromine, cyano, hydroxyl, $C_1-C_4$-alkoxy, phenoxy, $C_1-C_8$-alkoxycarbonyl or unsubstituted or substituted phenyl.

Specific examples of R are 2-chloroethyl, 2-bromoethyl, cyanomethyl, 2-cyanoethyl, 2-hydroxyethyl, 2-methoxyethyl, 2-ethoxyethyl, 2-propoxyethyl, 2-butoxyethyl, 2-phenoxyethyl, methoxycarbonylmethyl, ethoxycarbonylmethyl, 2-methoxycarbonylethyl, 2-ethoxycarbonylethyl, benzyl, phenethyl, o-, m- and p-methylbenzyl, o-, m- and p-bromobenzyl, o-, m- and p-chlorobenzyl, o-, m- and p-methoxybenzyl, o-, m- and p-ethoxybenzyl and o-, m- and p-nitrobenzyl.

The radicals of the coupling components K correspond, for example, to the formula

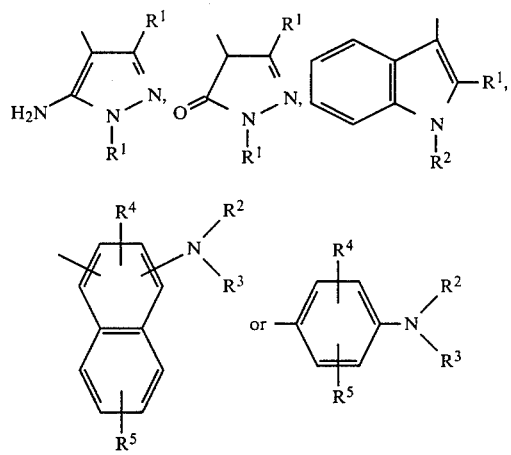

where $R^1$ is hydrogen, alkyl, aralkyl, or aryl, $R^2$ is hydrogen or $R^3$, $R^3$ is unsubstituted or substituted alkyl, aralkyl or aryl, and $R^4$ and $R^5$ are hydrogen, alkyl, alkoxy, phenoxy, halogen, alkylsulfonylamino, dialkylaminosulfonylamino or acylamino.

Specific examples of $R^1$, in addition to those mentioned above, are methyl, ethyl, propyl, butyl, benzyl, phenethyl, phenyl, o-, m- and p-tolyl and o-, m- and p-chlorophenyl.

Examples of $R^3$, in addition to those mentioned above, are $C_1-C_6$-alkyl which may be substituted by chlorine, bromine, hydroxyl, $C_1-C_8$-alkoxy, phenoxy, cyano, carboxyl, $C_1-C_8$-alkanoyloxy, benzoyloxy, o-, m- and p-methylbenzoyloxy, o-, m- and p-chlorobenzoyloxy, $C_1-C_4$-alkoxyalkanoyloxy, phenoxyalkanoyloxy, $C_1-C_8$-alkoxycarbonyloxy, $C_1-C_8$-alkoxyalkoxycarbonyloxy, benzyloxycarbonyloxy, phenethyloxycarbonyloxy, phenoxyethoxycarbonyloxy, $C_1-C_8$-alkylaminocarbonyloxy, cyclohexylaminocarbonyloxy, phenylaminocarbonyloxy, $C_1-C_8$-alkoxycarbonyl, $C_1-C_8$-alkoxyalkoxycarbonyl, phenoxycarbonyl, benzyloxycarbonyl or phenethyloxycarbonyl, and further examples are phenyl, benzyl, phenylethyl and cyclohexyl.

Specific examples of $R^3$ are methyl, ethyl, propyl, butyl, phenyl, hexyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenoxycarbonyloxyethyl, 2-benzoyloxycarbonylethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-$\beta$-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl and 2-benzoylethyl.

Examples of radicals R4 and R5 are hydrogen, methyl, ethyl, propyl, bromine, chlorine, methoxy, ethoxy, phenoxy, benzyloxy, $C_1-C_6$-alkanoylamino, benzoylamino, $C_1-C_4$-alkylsulfonylamino and di-$C_1-C_4$-alkylaminosulfonylamino.

The compounds of the formula I may be prepared by diazotizing a diazo component of the formula

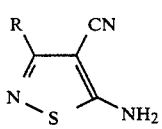

by a conventional method, and then reacting it with a compound of the formula

H-K.

Details of the reactions may be found in the Examples, wherein parts and percentages are by weight, unless stated otherwise.

The compounds of the formula I range from yellow to blue and are useful for dyeing cellulose triacetate and especially polyesters, on which they give brilliant, deeply colored dyeings having very good fastness characteristics, in particular high lightfastness. In this context, it can be advantageous to use a mixture of compounds of the formula I.

Compounds of particular importance are those of the formula Ia

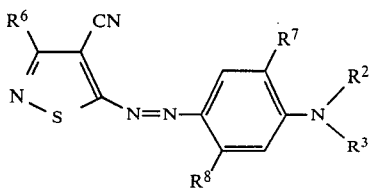

where R⁶ is benzyl, phenethyl, o-, m- or p-chlorobenzyl, o-, m- or p-methoxybenzyl or -ethoxybenzyl or o-, m- or p-nitrobenzyl, R⁷ is hydrogen, methyl, methoxy, ethoxy or chlorine, R⁸ is hydrogen, methyl, methoxy, chlorine, acetylamino, propionylamino, methylsulfonylamino or dimethylaminosulfonylamino, and R² and R³ have the stated meanings.

Preferably, R² is hydrogen or R³, R³ being methyl, ethyl, propyl, butyl, β-cyanoethyl, β-hydroxyethyl, C₁-C₄-alkoxycarbonylmethyl, C₁-C₄-β-alkoxycarbonyloxyethyl, C₁-C₄-alkanoyloxyethyl, C₁-C₄-alkoxycarbonyloxyethyl, C₁-C₄-alkylaminocarbonyloxyethyl, phenylaminocarbonyloxyethyl, benzyl or phenethyl.

EXAMPLE 1

21.5 parts of 5-amino-3-benzyl-4-cyano-isothiazole were dissolved in 150 parts of a 3:1 glacial acetic acid/propionic acid mixture and 70 parts of 85% strength sulfuric acid, 32 parts of nitrosylsulfuric acid (11.5% of $N_2O_3$) were added slowly at 0°–5° C., and the mixture was then stirred for 4 hours at 0°–5° C.

17.4 parts of N-cyanoethyl-N-ethylaniline were introduced into a mixture of 330 parts of water, 35 parts of concentrated hydrochloric acid and 1.7 parts of diisobutylnaphthalene-1-sulfonic acid mixture. About 400 parts of ice were added and the diazo solution was then run in slowly at 0°–5° C. After completion of coupling, the dye suspension obtained was heated to 60° C. and filtered, and the filter cake was washed neutral with water and then dried under reduced pressure at 60° C. 31.5 parts of the dye of the formula

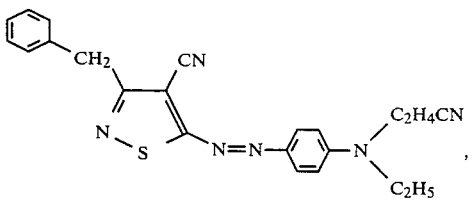

were obtained; the product gave very fast bluish red dyeings on polyesters.

EXAMPLE 2

A solution of 25 parts of N-benzyl-N-cyanoethyl-m-toluidine in 100 parts of dimethylformamide was introduced into a mixture of 300 parts of water, 35 parts of concentrated hydrochloric acid and 1.7 parts of diisobutylnaphthalene-1-sulfonic acid mixture. After addition of about 400 parts of ice, a diazo solution prepared as in Example 1 from 21.5 parts of 5-amino-3-benzyl-4-cyano-isothiazole was run in slowly at 0°–5° C. and stirring was continued until coupling was complete. The dye suspension was heated to 50° C. and filtered, and the filter cake was washed neutral with water. Drying under reduced pressure at 60° C. gave 47 parts of the dye of the formula

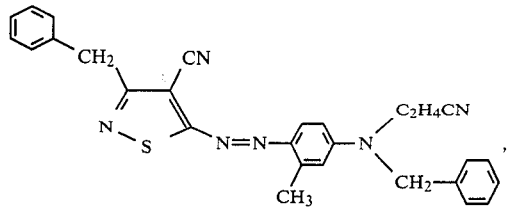

which gave very fast bluish red dyeings on polyesters.

EXAMPLE 3

24.3 parts of 3-methylsulfonylamino-N,N-diethylaniline were dissolved in 150 parts of dimethylformamide, and the solution was added to a mixture of 300 parts of water, 35 parts of concentrated hydrochloric acid and 1.7 parts of diisobutylnaphthalene-1-sulfonic acid mixture. After addition of about 400 parts of ice, a diazo solution prepared as in Example 1 from 21.5 parts of 5-amino-3-benzyl-4-cyano-isothiazole was run in slowly at 0°–5° C. After completion of coupling, the dye suspension was heated to 50° C. and filtered. The filter cake was washed neutral with water and dried under reduced pressure at 50° C. 40.5 parts of the dye of the formula

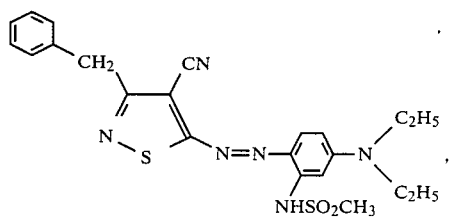

where obtained; the product dyed polyesters in very fast clear reddish violet hues.

EXAMPLE 4

25.0 parts of ethyl-n-propylaminocarbonyloxyethylaniline were dissolved in 20 parts of dimethylformamide and 40 parts of 32 percent strength hydrochloric acid, and the solution was added to a mixture of 300 parts of water and 1.2 parts of diisobutylnaphthalene-1-sulfonic acid mixture. After addition of 400 parts of ice, a solution prepared as in Example 1 from 21.5 parts of 5-amino-3-benzyl-4-cyanoisothiazole was run in slowly at about 0° C. After completion of coupling, the dye was filtered off and washed neutral. Drying under reduced pressure at 50° C. gave 42.4 parts of the dye of the formula

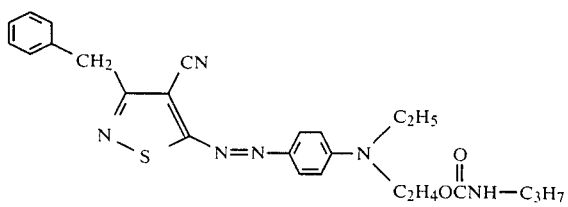

which dyed polyesters in very fast clear bluish red hues.

EXAMPLE 5

33.6 parts of cyanoethyl-ethyloxyethyloxycarbonyloxyethylaniline were dissolved in 40 parts of 32% strength hydrochloric acid, and the solution was added to a mixture of 300 parts of water and 1.2 parts of diisobutylnaphthalene-1-sulfonic acid mixture. After addition of 400 parts of ice, a solution prepared as in Example 1 from 21.5 parts of 5-amino-3-benzyl-4-cyanoisothiazole was slowly added dropwise, with the temperature not exceeding 0° C. After completion of coupling, the dye formed was filtered off with suction and washed neutral. Drying under reduced pressure at 50° C. gave 47 parts of the dye of the formula

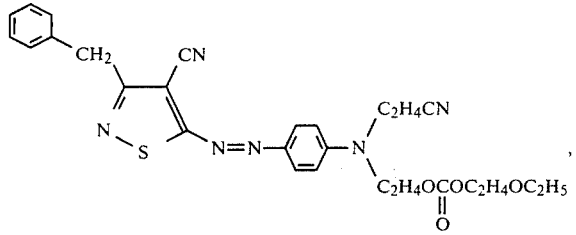

which dyed polyesters in very fast clear red hues.

The dyes identified by their diazo component and coupling component in the Table which follows were obtained in a similar manner.

| Example No. | D | K | Hue on polyesters |
|---|---|---|---|
| 6 | ![benzyl-cyano-isothiazole with CH3] | aryl-N(C$_2$H$_4$CN)(C$_2$H$_4$OCCH$_3$=O) | red |
| 7 | " | aryl-N(C$_2$H$_4$OCCH$_3$=O)(C$_2$H$_4$OCCH$_3$=O) | red |
| 8 | " | aryl-N(C$_2$H$_5$)(C$_2$H$_4$COOCH$_3$) | bluish red |
| 9 | " | aryl-N(C$_2$H$_5$)(C$_2$H$_4$OCCH$_3$=O) | bluish red |
| 10 | " | aryl-N(C$_2$H$_5$)(CH$_2$-phenyl) | bluish red |
| 11 | " | aryl-N(C$_2$H$_5$)(C$_2$H$_4$OCOCH$_3$) | bluish red |
| 12 | " | aryl-N(C$_2$H$_5$)(C$_2$H$_4$OCNHCH(CH$_3$)$_2$=O) | bluish red |

-continued

| Example No. | D | K | Hue on polyesters |
|---|---|---|---|
| 13 | " | 4-methyl-3-methylphenyl-N,N-bis(C$_2$H$_4$OCOCH$_3$) | bluish red |
| 14 | " | 4-methylphenyl-N,N-bis(C$_2$H$_4$CN) | red |
| 15 | " | 4-methyl-3-methylphenyl-N(C$_2$H$_4$CN)(C$_2$H$_4$OCOCH$_3$) | red |
| 16 | " | 2,4-dimethylphenyl-NHC$_2$H$_4$C(O)C$_6$H$_5$ | red |
| 17 | " | 2,4,5-trimethylphenyl-NHC$_2$H$_4$CN | bluish red |
| 18 | " | 4-methyl-3-(NHCOCH$_3$)phenyl-N(C$_2$H$_5$)$_2$ | violet |
| 19 | " | 4-methyl-5-(NHCOCH$_3$)-2-OCH$_3$-phenyl-N(C$_2$H$_5$)$_2$ | bluish violet |
| 20 | " | 4-methyl-3-(NHSO$_2$CH$_3$)phenyl-N(CH$_3$)$_2$ | reddish violet |
| 21 | " | 4-methyl-3-(NHSO$_2$CH$_3$)phenyl-NHC$_2$H$_4$CN | red |

-continued

| Example No. | D | K | Hue on polyesters |
|---|---|---|---|
| 22 | " | 4-methyl-2-(NHSO₂CH₃)-N(C₂H₅)(C₂H₄CN)-phenyl | bluish red |
| 23 | " | 4-methyl-2-NHC₂H₄CN-5-NHSO₂CH₃-phenyl (with CH₃) | bluish red |
| 24 | " | 4-methyl-2-NHC₂H₄COC₂H₄-C₆H₅-5-NHSO₂CH₃-phenyl | bluish red |
| 25 | " | 4-morpholinophenyl | red |
| 26 | " | 4-methyl-1-(NH—C₂H₄OH)-naphthyl | reddish blue |
| 27 | " | 4-methyl-2-OCH₃-NH—C₂H₄CN-phenyl | red |
| 28 | " | 4-methyl-1-NH₂-naphthyl | red |
| 29 | " | 4-methyl-3-CH₃-NHCH₂COOCH₃-phenyl | red |
| 30 | " | 4-methyl-2-NHSO₂CH₃-NHC₂H₄COOCH₃-phenyl | bluish red |

-continued

| Example No. | D | K | Hue on polyesters |
|---|---|---|---|
| 31 | " | 3-methyl-1-phenyl-5-hydroxy-4-methyl pyrazole (HO, CH₃, CH₃, N–N–Ph) | yellow |
| 32 | " | 5-amino-4-methyl-1-benzyl pyrazole (H₂N, CH₃, N–N–CH₂Ph) | yellow |
| 33 | " | N-methyl indole derivative (with phenyl and methyl substituents) | orange |
| 34 | " | –C₆H₄–N(C₄H₉(n))(C₂H₄CN) | bluish red |
| 35 | " | –C₆H₃(NHCOCH₃)–NHC₂H₄CN | red |
| 36 | " | 2,4,5-trimethyl-C₆H₂–NHCH₂COOCH₃ | red |
| 37 | " | –C₆H₃(NHCOCH₃)–NHCH₂COOCH₃ | bluish red |
| 38 | " | –C₆H₄–N(CH₂Ph)(C₂H₄COOCH₃) | bluish red |

-continued
| Example No. | D | K | Hue on polyesters |
|---|---|---|---|
| | D—N=N—K | | |
| 39 | " | 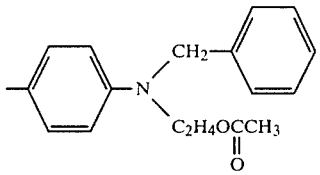 | bluish red |
| 40 | " | 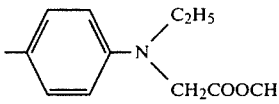 | red |
| 41 | " |  | violet |
| 42 | " | 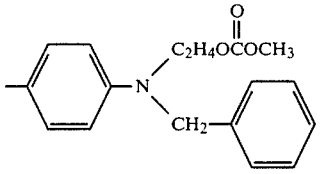 | red |
| 43 | " | 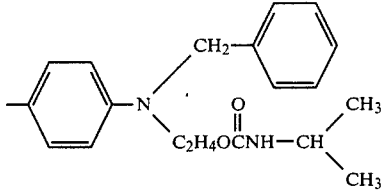 | bluish red |
| 44 | " | 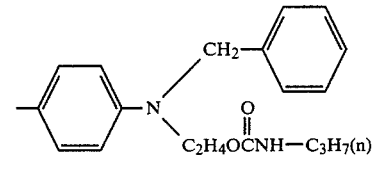 | bluish red |
| 45 | " | 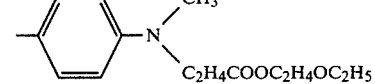 | bluish red |
| 46 | " | 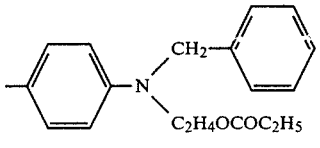 | red |
| 47 | " | 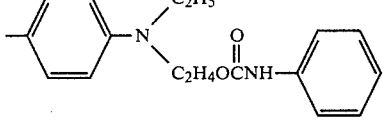 | violet |

-continued

| Example No. | D | K | Hue on polyesters |
|---|---|---|---|
| | | D—N=N—K | |
| 48 | " | 4-methylphenyl-N(CH₂-4-chlorophenyl)(C₂H₄OC(O)NH—CH(CH₃)₂) | red |
| 49 | " | 4-methylphenyl-N(CH₂-2-chlorophenyl)(C₂H₄OC(O)CH₃) | red |
| 50 | " | 4-methylphenyl-N(CH₂-2-cyanophenyl)(C₂H₄OC(O)NH—CH(CH₃)₂) | red |
| 51 | " | 4-methylphenyl-N(CH₂-phenyl)(C₂H₄OC₂H₄CN) | bluish red |
| 52 | " | phenyl-N(C₂H₅)(C₂H₄OC₂H₄CN) | violet |
| 53 | " | 4-methylphenyl-N(CH₂-phenyl)(C₂H₄OH) | bluish red |
| 54 | " | 3-methyl-4-(N(C₂H₅)(C₂H₄OC(O)NH—CH(CH₃)₂))phenyl | violet |
| 55 | " | 3-methyl-4-(N(C₂H₅)(C₂H₄OC(O)NH—phenyl))phenyl | violet |
| 56 | " | 4-methylphenyl-N(C₂H₅)(C₂H₄OC(O)NH-3-chlorophenyl) | violet |

-continued

| Example No. | D | K | Hue on polyesters |
|---|---|---|---|
| 57 | " | 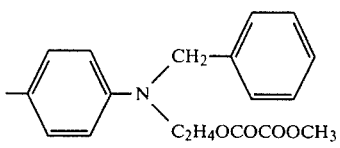 4-methylphenyl-N(CH2Ph)(C2H4OCOCOOCH3) | bluish red |
| 58 | " | 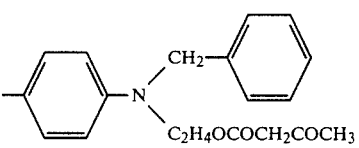 4-methylphenyl-N(CH2Ph)(C2H4OCOCH2COCH3) | bluish red |
| 59 | " | 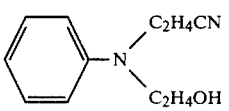 phenyl-N(C2H4CN)(C2H4OH) | red |
| 60 | " | 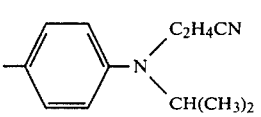 4-methylphenyl-N(C2H4CN)(CH(CH3)2) | red |
| 61 | " | 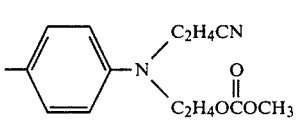 4-methylphenyl-N(C2H4CN)(C2H4OCOCH3) | red |
| 62 | " | 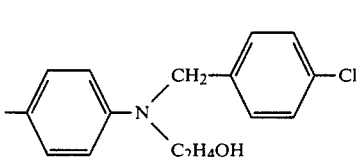 4-methylphenyl-N(CH2-4-ClC6H4)(C2H4OH) | red |
| 63 | " | 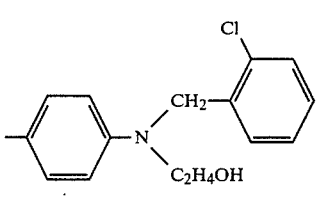 4-methylphenyl-N(CH2-2-ClC6H4)(C2H4OH) | red |
| 64 | " | 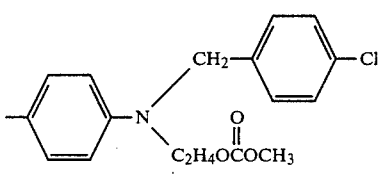 4-methylphenyl-N(CH2-4-ClC6H4)(C2H4OCOCH3) | red |
| 65 | 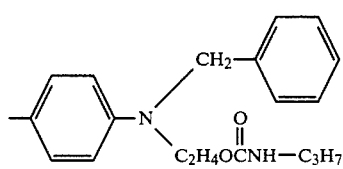 | 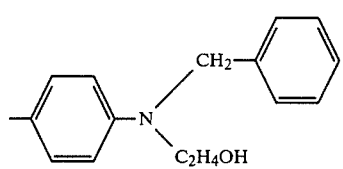 4-methylphenyl-N(CH2Ph)(C2H4OCNH—C3H7) | bluish red |
| 66 | " | 4-methylphenyl-N(CH2Ph)(C2H4OH) | bluish red |

-continued
| Example No. | D | K | Hue on polyesters |
|---|---|---|---|
| 67 | " | 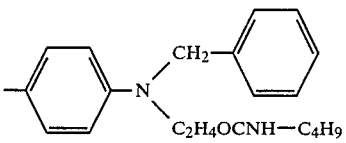 | bluish red |
| 68 | " | 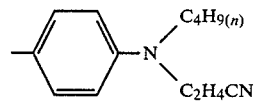 | bluish red |
| 69 | " | 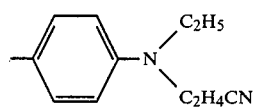 | bluish red |
| 70 | " | 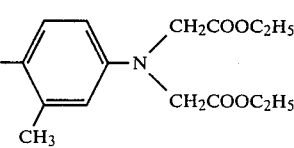 | red |
| 71 | " | 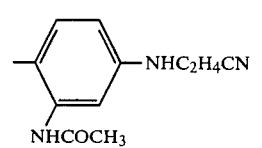 | bluish red |
| 72 | " | 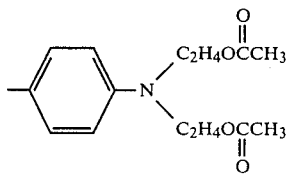 | bluish red |
| 73 | " | 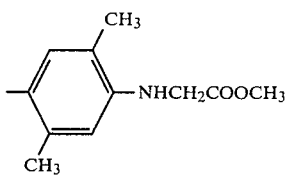 | red |
| 74 | " | 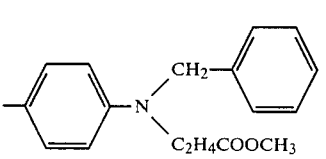 | bluish red |
| 75 | " | 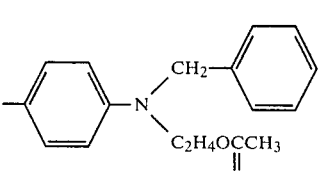 | bluish red |
| 76 | " | 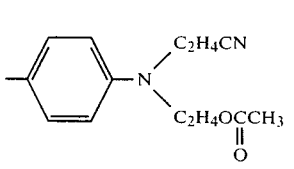 | red |

| Example No. | D | K | Hue on polyesters |
|---|---|---|---|
| 77 | " | | bluish red |
| 78 | " | | bluish red |

We claim:

1. An isothiazolazo dye of the formula:

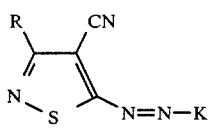

wherein R is a $C_1$–$C_4$ alkyl which is substituted by chlorine, bromine, cyano, hydroxyl, $C_1$–$C_4$-alkoxy, phenoxy, $C_1$–$C_8$-alkoxycarbonyl or an unsubstituted phenyl or a phenyl substituted by methyl, chloro, bromo, methoxy, ethoxy or nitro; and K is

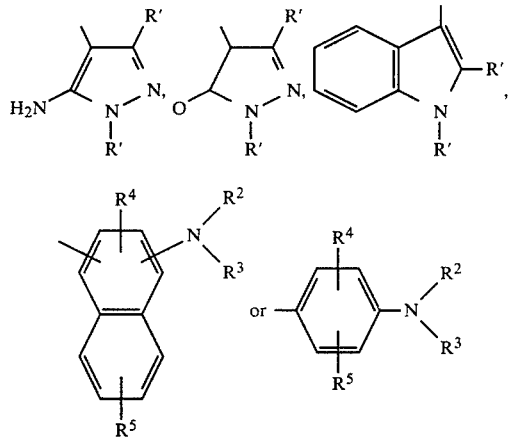

wherein $R^1$ is hydrogen, alkyl, aralkyl, aryl or aryl substituted by chlorine, $R^2$ is hydrogen or $R^3$, $R^3$ is $C_1$–$C_6$ alkyl or $C_1$–$C_6$ alkyl substituted by chlorine, bromine or hydroxyl, $C_1$–$C_8$ alkoxy, phenoxy, cyano, carboxyl, $C_1$–$C_8$-alkanoyloxy, benzoyloxy, o-, m-, and p-methylbenzoyloxy, o-, m- and p-chlorobenzoyloxy, $C_1$–$C_4$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl or phenethyloxycarbonyl, or phenyl, benzyl, phenylethyl and cyclohexyl; and $R^4$ and $R^5$ are hydrogen, alkyl, alkoxy, phenoxy, halogen, alkylsulfonylamino, dialkylaminosulfonylamino or acylamino.

2. The isothiazolazo dye as claimed in claim 1, wherein $R^3$ is methyl, ethyl, propyl, butyl, phenyl, hexyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxyproyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butyoxycarbonyloxyethyl, 2-phenyloxycarbonyloxyethyl, 2-benzoyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-$\beta$-phenylethoxycarbonylethyl, 2-methoxyethoxycarbonylethyl, 2-ethoxyethoxycarbonylethyl, 2-propoxyethoxycarbonylether, 2-butoxyethoxycarbonylethyl, 2-phenoxyethoxycarbonylethyl and 2-benzoylethyl; and $R^4$ and $R^5$ are hydrogen, methyl, ethyl, propyl, bromine, chlorine, methoxy, ethoxy, phenoxy, benzyloxy, $C_1$–$C_6$-alkanoylamino, benzoylamino, $C_1$–$C_4$-alkylsulfonylamino and di-$C_1$–$C_4$-alkylaminosulfonylamino.

3. The isothiazolazo dye as claimed in claim 1 having the formula:

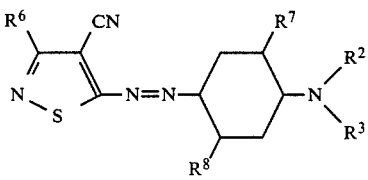

wherein $R^6$ is benzyl, phenethyl, o-, m- or p-chlorobenzyl, o-, m- or p-methoxybenzyl or -ethoxybenzyl or o-, m- or p-nitrobenzyl; $R^7$ is hydrogen, methyl, methoxy, ethoxy or chlorine; $R^8$ is hydrogen, methyl, methoxy, ethoxy, chlorine, acetylamino, propylamino, methylsulfonylamino, or dimethylaminosulfonamino; and $R^2$ and $R^3$ have the stated meanings.

4. The isothiazolazo dye as claimed in claim 3, wherein $R^2$ is hydrogen or $R^3$, $R^3$ being being methyl, ethyl, propyl, butyl, β-cyanoethyl, β-hydroxyethyl, $C_1$–$C_4$-alkoxycarbonylmethyl, $C_1$–$C_4$-β-alkoxycarbonyloxyethyl, $C_1$–$C_4$-alkanoyloxyethyl, $C_1$–$C_4$-alkoxycarbonyloxyethyl, $C_1$–$C_4$-alkylaminocarbonyloxyethyl, phenylaminocarbonyloxyethyl, benzyl or phenethyl.

5. An isothiazolazo dye having the formula:

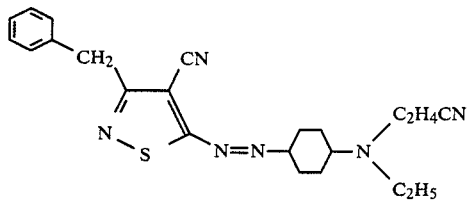

6. An isothiazolazo dye having the formula:

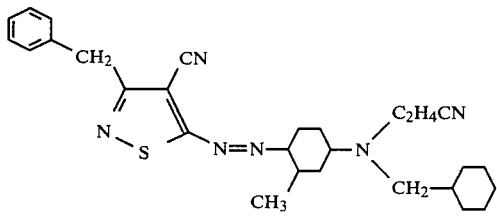

7. An isothiazolazo dye having the formula:

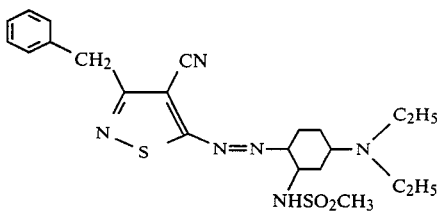

8. An isothiazolazo dye having the formula:

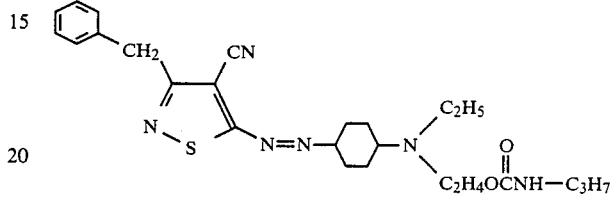

9. An isothiazlazo dye having the formula:

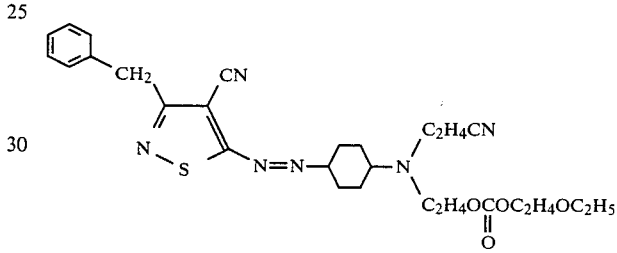

* * * * *